United States Patent
Lipinski et al.

[11] Patent Number: 6,125,625
[45] Date of Patent: Oct. 3, 2000

[54] LOW NOX CONDITIONER SYSTEM FOR A MICROTURBINE POWER GENERATING SYSTEM

[75] Inventors: John Lipinski, Tempe; Kurt Meister, Apache Jct., both of Ariz.; Patrick O'Brien, Torrance; Colin Taylor, Lakewood, both of Calif.

[73] Assignee: AlliedSignal, Inc., Morristown, N.J.

[21] Appl. No.: 08/995,460

[22] Filed: Dec. 20, 1997

[51] Int. Cl.[7] .................. F23R 3/40; F02C 7/10; F02C 7/26
[52] U.S. Cl. ............... 60/39.141; 60/723; 60/39.511
[58] Field of Search .................. 60/39.06, 39.142, 60/39.141, 39.511, 723

[56] References Cited

U.S. PATENT DOCUMENTS

| | | | |
|---|---|---|---|
| 4,112,675 | 9/1978 | Pillsbury et al. | 60/39.142 |
| 4,202,168 | 5/1980 | Acheson et al. | 60/723 |
| 4,202,169 | 5/1980 | Acheson et al. | 60/723 |
| 4,754,607 | 7/1988 | Mackay | 60/723 |
| 5,165,224 | 11/1992 | Spadaccini et al. | 60/723 |
| 5,235,804 | 8/1993 | Colket, III et al. | 60/723 |
| 5,937,632 | 8/1999 | Dobbeling et al. | 60/723 |

FOREIGN PATENT DOCUMENTS

| | | | |
|---|---|---|---|
| 0472294 | 2/1992 | European Pat. Off. | |
| 5-346207 | 12/1993 | Japan | 60/723 |

*Primary Examiner*—Ted Kim
*Attorney, Agent, or Firm*—Ephraim Starr; Kevin Wildenstein

[57] ABSTRACT

A microturbine power generation system includes an electrical generator, a turbine and a compressor intermediate the generator and the turbine. The turbine, compressor and electrical generator are secured together by a tieshaft. The tieshaft is prestressed such that faces of the turbine, electrical generator and compressor maintain contact during high-speed, high-temperature operation of the system.

20 Claims, 3 Drawing Sheets

LOW NOX CONDITIONER SYSTEM FOR A MICROTURBINE POWER GENERATING SYSTEM

BACKGROUND OF THE INVENTION

The present invention relates generally to microturbine power generating systems. More specifically, the present invention relates to an ultra low emission catalytic combustor system for a microturbine power generating system.

The United States Electric Power Research Institute (EPRI) which is the uniform research facility for domestic electric utilities, predicts that up to 40% of all new generation could be provided by 'distributed generators' by the year 2006. In many parts of the world, the lack of electric infrastructure (transmission and distribution lines) will greatly expedite the commercialization of 'distributed generation' technologies since central plants not only cost more per kilowatt, but also must have expensive infrastructure installed to deliver the product to the consumer.

Small, multi-fuel, modular distributed microturbine generation units could help alleviate current afternoon "brown-outs" and "blackouts" prevalent in many parts of the world. A simple, single moving part concept would allow for low technical skill maintenance and low overall cost would allow for wide spread purchase in those parts of the world where capital is sparse. In addition, given the United States emphasis on electric deregulation and the world trend in this direction, consumers of electricity would have not only the right to choose the correct method of electric service but also a new cost effective choice from which to chose. U.S. Pat. No. 4,754,607, which is assigned to the assignee of the present invention, discloses a microturbine power generating system suitable for cogeneration applications.

Yet to make these units commercially attractive to consumers, improvements are needed in areas such as increasing fuel-efficiency, reducing size and weight, and lowering thermal signature, noise, maintenance and cost penalties.

Catalytic combustion has long been known to offer potential for providing ultra-low NOx emissions from gas turbines. However for simple-cycle gas turbines the combustor inlet temperature is typically too low for catalytic operation, particularly at part power, and most particularly for smaller, lower-pressure-ratio engines. The addition of a recuperator to the cycle, which recovers turbine waste heat and delivers a higher combustor inlet temperature at all operating conditions, makes catalytic combustion and ultra-low-NOx emissions possible over the full engine duty cycle, even for small engines.

Catalytic combustion is possible only when the combustor inlet temperature exceeds a minimum value which is a function of the catalyst formulation, and which is typically higher than the combustor inlet temperature for simple-cycle gas turbines, or for recuperated engines at startup conditions. Thus a conventional diffusion-flame preheater is required for engine starting, and for accelerating the engine to the speed necessary to obtain an adequate operating temperature. Once this condition has been reached, the preheater can be shut off. At this point a separate fuel delivery system may be used to introduce fuel into the premix duct, where the fuel is evaporated and mixed with the incoming air, and then introduced into the catalyst bed. In order to obtain minimum combustor emissions and to avoid damage to the catalyst bed, complete evaporation of the fuel as well as very high-quality mixing of air and fuel must be achieved within the premix duct. Within the catalyst bed, combustion is initiated by catalytic action near the bed walls. Under appropriate conditions, dual phase combustion occurs which completes the combustion reaction in the gas phase. This process which results in low NOx production as well as very low Co and HC emission over a wide range of engine speeds and loads.

At the high combustor inlet temperatures necessary for catalyst operation, auto-ignition of the fuel within the pre-mix duct is a distinct possibility. However, this must be avoided because it would result in high flame temperatures and thus high NOx production. This problem is particularly acute for diesel fuel, which exhibits an ignition delay period much shorter than natural gas or even jet fuel. Thus the challenge in designing the premixing system lies in obtaining the necessary fuel evaporation and fuel-air mixing quality while avoiding auto-ignition. In addition, for this application compact size is required. This resulted in the design solution of integrating the preheater with the premix duct, which significantly shortens the overall combustor package. Unlike the premixer, however, the preheater must support a stable flame during its operation.

Catalytic combustion can provide extremely low emissions not only of NOx but of other pollutants as well. This is because the catalyst can support combustion at extremely lean fuel-air ratios, resulting in low peak temperatures within the combustor and hence little or no production of thermal NOx. At the same time carbon monoxide (CO) and unburned hydrocarbon (HC) emissions are minimized by reaction of the fuel at the catalyst surface, which can raise the gas temperature to the point where homogeneous gas-phase combustion can occur. Thus a properly designed catalytic combustor can deliver simultaneously low NOx, CO, and HC emissions over the full engine operating range, in contrast to more conventional lean-burn combustors which may suffer from high NOx or high CO at different points in the duty cycle. In addition, stability and acoustic problems often associated with alternative low-NOx combustors are avoided with catalytic combustion, as are the complications of variable geometry. While catalytic combustion is not a new technology, the current example makes use of novel design practices resulting in a compact package suitable for mobile applications.

It has long been known that exhaust gases produced by combusting hydrocarbon fuels can contribute to atmospheric pollution. Exhaust gases typically contain pollutants such as nitric oxide (NO) and nitrogen dioxide ($NO_2$), which are frequently grouped together as $NO_x$, unburned hydrocarbons (UHC), carbon monoxide (CO), and particulates, primarily carbon soot. Nitrogen oxides are of particular concern because of their role in forming ground level smog and acid rain and in depleting stratospheric ozone.

The rate of the thermal $NO_x$ production in gas turbine combustors is a function of temperature, pressure, and residence time. Turbine efficiency can be increased by raising the maximum operating temperature, although equipment costs increase sharply due to the need for special materials of construction. Conventionally, hot gas is supplied to the turbine from a precombustor burning a fuel with air to supply hot gas to the turbine at maximum allowable temperature, as limited by mechanical construction. This combustor is at elevated pressure and normally uses a clean gas or liquid fuel.

In acknowledging a need to control atmospheric pollution, a gas turbine engine with a catalytic combustor offers the potential of very low emissions once the system is up to full operating temperature. However, during cold starting of the engine, significant levels of emissions are generated until the catalytic combustor has reached its operating temperature.

It would be desirable, then, to provide an ultra low emission catalytic combustor for a gas turbine engine which would allow cold starting of the engine, with the resulting emissions being no higher than those produced during normal running.

SUMMARY OF THE INVENTION

The invention can be regarded as providing a low NOx conditioner system and process for a microturbine power generating system including an electrical generator and a turbine that can be rotated by a single prestressed shaft. More particularly the present invention provides a low NOx method of cold starting a gas turbine engine with the resulting emissions being no higher than those produced during normal running. A low NOx conditioner system and process is employed to reduce emission. In a preferred embodiment the systems and process can include a catalytic combustor. A low NOx conditioner system can be located in the gas stream between the compressor and the combustor, alternately between and the compressor and the recuperator and the recuperator and the combustor. The low NOx conditioner system and process ensures achievement of full operating temperature, preferable catalytic oxidization of the fuel enables and virtually complete combustion with very low levels of UHC, CO and NOx.

In accordance with one aspect of the present invention, a system of cold staring a microturbine power generating system employs a low NOx conditioner segment operable disposed between said compressor and the recuperator to receive, heat, mix with fuel and combust compressor air during startup of the system to enhance the combustibility of the air from said compressor and to increase the temperature of the air to a temperature T4 sufficient to initiate and sustain a low NOx combustion reaction within the combustor.

In accordance with one aspect of the present invention, a system of cold staring a microturbine power generating system employs a low NOx conditioner segment operably disposed between said recuperator and the combustor to receive, heat, mix and combust fuel during startup of the system to enhance the combustibility of the air from said recuperator and to increase the temperature of the air to a temperature T4 sufficient to initiate and sustain a low NOx combustion reaction within the combustor;

In accordance with one aspect of the method of the present invention, a process for cold staring a microturbine power generating system employs a low NOx conditioner process includes the steps of supplying additional heat to the compressed air; adding fuel to form a fuel-air mixture in a premixer; combusting said fuel air mixture in pre-burner to pre oxidize the mixture and supplying the pre oxidize mixture to the recuperator at a temperature sufficient to initiate and sustain a low NOx combustion reaction within the preburner and the combustor.

In accordance with one aspect of the method of present invention, a process for cold staring a microturbine power generating system employs a low NOx conditioner process includes the steps of supplying additional heat to the recuperated compressed air; adding fuel to form a fuel-air mixture in a premixer; combusting said fuel air mixture in pre-burner to pre oxidize the mixture and supplying the pre oxidize mixture at a temperature sufficient to initiate and sustain a low NOx combustion reaction within the preburner and the combustor.

In the drawings as hereinafter described, a preferred embodiment is depicted; however, various other modifications and alternative constructions can be made thereto without departing from the true spirit and scope of the invention.

A recuperator can raise the temperature of incoming compressed air to a temperature sufficient to cause combustion to occur. Hot, expanding gases resulting from the combustion are expanded through a turbine, and the resulting turbine power generated by the turbine is used for powering the electrical generator. The microturbine power generating system further includes a single shaft connecting the turbine and electrical generator in prestressed relation to allow the electrical generator to rotate in unison with the turbine and to thereby use the mechanical energy extracted by the turbine to produce power.

Electricity production of the system is especially flexible. A variable frequency ac output produced by the electrical generator can be rectified to dc power. The dc power can then be chopped by an inverter to produce ac power having a selected frequency.

BRIEF DESCRIPTION OF THE DRAWINGS

The novel features of the invention are set forth with particularity in the appended claims, however, invention itself, both as to organization and method of operation, together with objects and advantages thereof, may best be understood by reference to the following description taken in conjunction with the accompanying drawings in which:

DESCRIPTION OF THE PREFERRED EMBODIMENT

Figure 1:
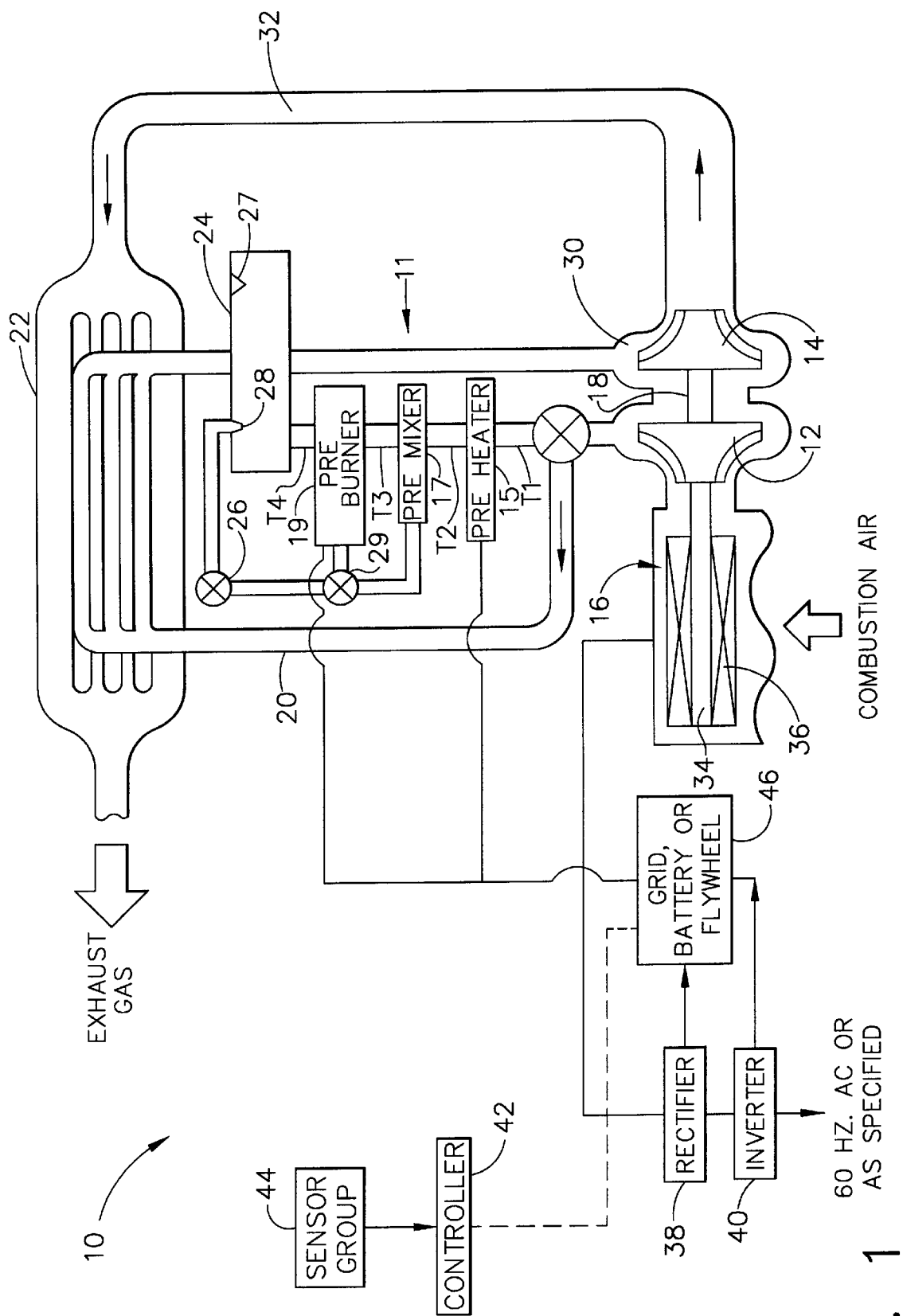
FIG. 1 is an illustration of a block diagram of a microturbine power generating system including a low NOx conditioner process according to the present invention.

Referring to FIG. 1, a power generating system 10 according to the present invention is illustrated. The power generating system 10 includes a compressor 12, a turbine 14 and an electrical generator 16. The electrical generator 16 is cantilevered from the compressor 16. The compressor 12, the turbine 14 and the electrical generator 16 can be rotated by a single shaft 18. Although the compressor 12, turbine 14 and electrical generator 16 can be mounted to separate shafts, the use of a common shaft 18 for rotating the compressor 12, the turbine 14 and the electrical generator 16 adds to the compactness and reliability of the power generating system 10.

Figure 2:
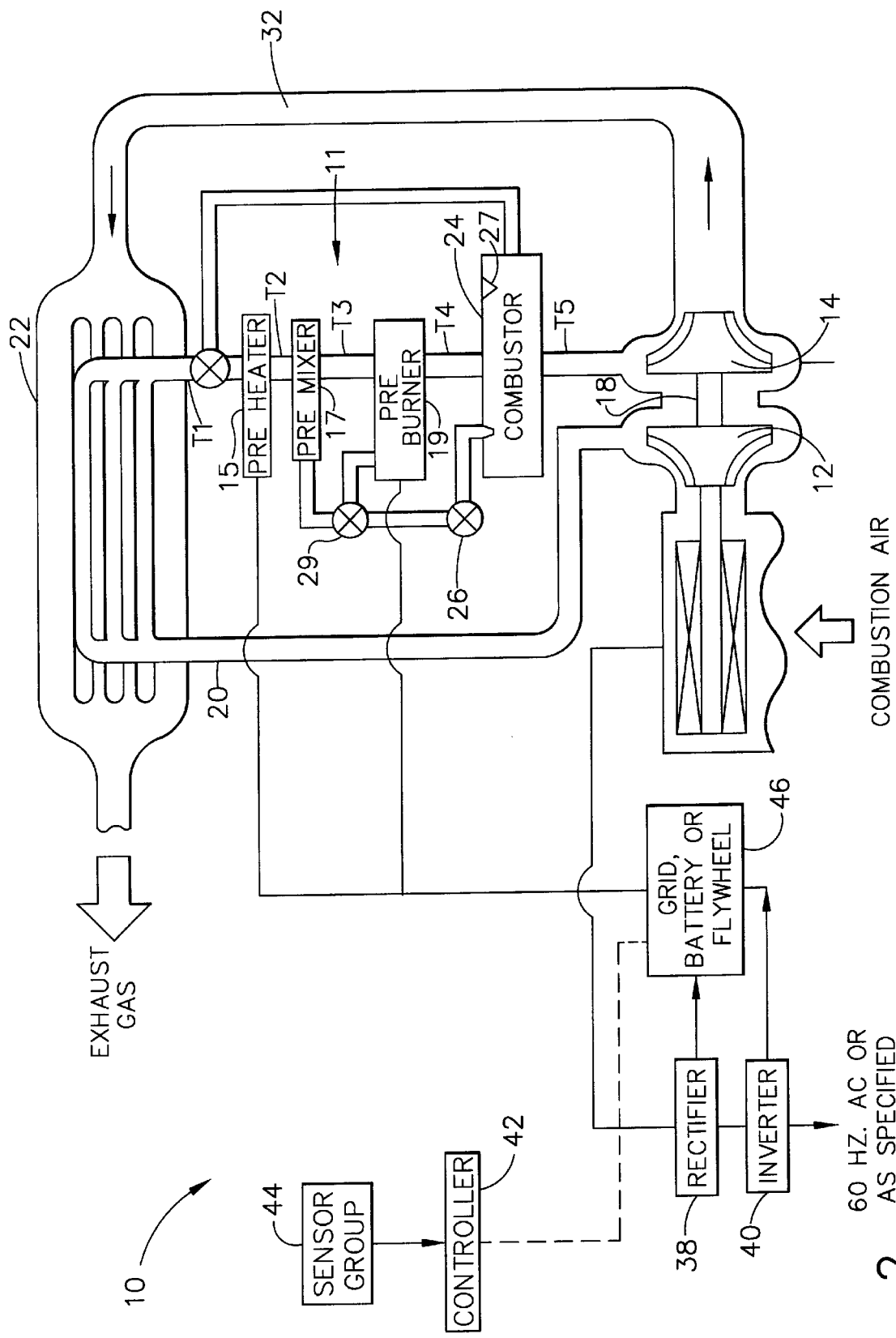
FIG. 2 is an illustration of a block diagram of a microturbine power generating system including a low NOx conditioner process according to the present invention.

The shaft 18 can be supported by self-pressurized air bearings such as foil bearings. As is shown in FIG. 2, the shaft 18 is supported by journal foil bearings 76 and 78 and thrust foil bearings 80. The foil bearings eliminate the need for a separate bearing lubrication system and reduce the occurrence of maintenance servicing.

Air entering an inlet of the compressor 12 is compressed. Compressed air leaving an outlet of the compressor 12 is circulated through cold side passages 20 in a cold side of a recuperator 22. In the recuperator 22, the compressed air absorbs heat, which enhances combustion. The heated, compressed air leaving the cold side of the recuperator 22 is supplied to a combustor 24.

Fuel is also supplied to the combustor 24. Both gaseous and liquid fuels can be used. In gaseous fuel mode, any suitable gaseous fuel can be used. Choices of fuel include diesel, flair gas, gasoline, naphtha, propane, JP-8, methane, natural gas and other man-made gases.

The flow of fuel is controlled by a flow control valve 26. The fuel is injected into the combustor 24 by an injection nozzle 28.

Inside the combustor 24 the fuel and compressed air are mixed and ignited by an igniter 27 in an exothermic reaction. In the preferred embodiment, the combustor 24 contains a suitable catalyst capable of combusting the compressed, high temperature, fuel-air mixture at the process conditions. Some known catalysts usable in the combustor 24 include platinum, palladium, as well as metal oxide catalyst with active nickel and cobalt elements.

After combustion, hot, expanding gases of the combustion are directed to an inlet nozzle 30 of the turbine 14. The inlet nozzle 30 has a fixed geometry. The hot, expanding gases resulting from the combustion is expanded through the turbine 14, thereby creating turbine power. The turbine power, in turn, drives the compressor 12 and the electrical machine 16.

Turbine exhaust gas is circulated by hot side passages 32 in a hot side of the recuperator 22. Inside the recuperator 22, heat from the turbine exhaust gas on the hot side is transferred to the compressed air on the cold side. In this manner, some heat of combustion is recuperated and used to raise the temperature of the compressed air en route to the combustor 24. After surrendering part of its heat, the combustion products exit the recuperator 22. Additional heat recovery stages could be added onto the power generating system 10.

The generator 16 can be a ring-wound, two-pole toothless (TPTL) brushless permanent magnet machine having a permanent magnet rotor 34 and stator windings 36. The turbine power generated by the rotating turbine 14 is used to rotate the rotor 34. The rotor 34 is attached to the shaft 18. When the rotor 34 is rotated by the turbine power, an alternating current is induced in the stator windings 36. Speed of the shaft 18 can be varied in accordance with external energy demands placed on the system 10. Variations in the shaft speed will produce a variation in the frequency of the alternating current (i.e., wild frequencies) generated by the electrical generator 16. Regardless of the frequency of the AC power generated by the electrical generator 16, the AC power can be rectified to DC power by a rectifier 38, and then chopped by a solid-state electronic inverter 40 to produce AC power having a fixed frequency. Accordingly, when less power is required, the shaft speed and, therefore, the speed of the turbine 14 can be reduced without affecting the frequency of the AC output.

Moreover, reducing the shaft speed reduces the airflow because the compressor runs slower. Consequently, the turbine inlet temperature remains essentially constant, thus maintaining a high efficiency at part load.

Use of the rectifier 38 and the inverter 40 allows for a wide flexibility in determining the electric utility service to be provided by the power generating system of the present invention. Because any inverter 40 can be selected, frequency of the ac power can be selected by the consumer. If there is a direct use for ac power at wild frequencies, the rectifier 38 and inverter 40 can be eliminated. When high frequency power is used for fluorescent lights, not only does the lamp operate more efficiently, but inductor ballasts can be replaced by a capacitor ballasts. Such direct high frequency voltage used in a lighting system can result in a 25% greater efficiency. If only dc power is desired, the inverter 40 can be eliminated. The resulting direct current can be used for plating, elevator operation and incandescent lighting.

The power generating system 10 can also include a battery 46 for providing additional storage and backup power. When used in combination with the inverter 40, the combination can provide uninterruptible power for hours after generator failure.

During operation of the power generating system 10, heat is generated in the electrical generator 16 due to inefficiencies in generator design. In order to extend the life of the electrical generator 16, as well as to capture useful heat, compressor inlet air flows over the generator 16 and absorbs excess heat from the generator 16. The rectifier 38 and the inverter 40 can also be placed in the air stream. After the air has absorbed heat from the aforementioned sources, it is compressed in the compressor 12 and further pre-heated in the recuperator 22.

A controller 42 controls the shaft speed by controlling the amount of fuel flowing to the combustor 24. The controller 42 uses sensor signals generated by a sensor group 44 to determine the external demands upon the power generating system 10, as well as generate control commands for operating the system 10 at maximum efficiency. The sensor group 44 could include sensors such as position sensors, shaft speed sensors and various temperature and pressure sensors for measuring operating temperatures and pressures in the system 10. Using the aforementioned sensors, the controller 42 controls both startup and optimal performance during steady state operation. The controller 42 can also determine the state of direct current storage in the battery 46 if supplied in the inverter 40, and adjust operations to maintain conditions of net charge, net drain, and constant charge of the battery.

A switch/starter control 48 can be provided offskid to start the power generating system 10. Rotation of the shaft 18 can be started by using the generator 16 as a motor. During startup, the switch/starter control 48 supplies an excitation current to the stator windings 34 of the electrical generator 16. Startup power is supplied by the battery 46. In the alternative, a compressed air device could be used to motor the power generating system 10.

To avoid excess emission during start -up and to enable a 'clean' start up to occur, completely vaporized fuel must be delivered to the combustor 24 which is already at or above a critical light-off temperature.

As is shown FIG. 1, and in accordance with one aspect of the present invention, a system of cold starting a microturbine power generating system 10 employs a low NOx conditioner segment 11 operably disposed between said compressor 12 and the start up of the system 10 to enhance the combustibility of the air from said compressor and sustain a low NOx combustion reaction within the combustor 24. More specifically employ aa preheater 15 to supply additional heat to the air compressed in the compressor 12; a premixer 17 to add fuel air mixture to pr oxidize the mixture and supplying the pre oxidize mixture to the recuperator at a temperature sufficient to initiate and sustain a low NOx combustion reaction within the preburner and the combustor.

In accordance with a method of present invention, a low NOx conditioner process for cold staring a microturbine power generating system employs includes the steps of supplying additional heat to compressed air; adding fuel to form a fuel-air mixture in a premixer; combusting said fuel air mixture in pre-burner to pre oxidize the mixture and supplying the pre oxidized mixture to the recuperator 22 at a temperature sufficient to initiate and sustain a low NOx combustion reaction within the combustor.

As is shown in FIG. 2. and in accordance with one aspect of the present invention, a system of cold staring a microturbine power generating system 10 employs a low NOx conditioner segment 11 operably disposed between said recuperator 22 and the combustor 14 to receive, heat, mix and combust fuel during startup of the system 10 to enhance the combustibility of the air from said recuperator and to increase the temperature of the air to a temperature T4 sufficient to initiate and sustain a low NOx combustion reaction within the combustor 24. More specifically the low NOx conditioner for stating a microturbine power generating system can employ a preheater 15 coupled to the recuperator to supply additional heat to the recuperated compressed air. A premixer 17 can be used to add fuel to the heated and compressed air to form a fuel-air mixture that is introduced into a pre-burner 19 for combusting the fuel air mixture to pre oxidize the mixture before supplying the pre oxidize mixture to the combustor 24 at a temperature sufficient to initiate and sustain a low NOx combustion reaction within the preburner and the combustor.

In accordance with another method of present invention, a low NOx conditioner process for cold staring a microturbine power generating system employs includes the steps of supplying additional heat to the recuperated compressed air; adding fuel to form a fuel-air mixture in a premixer; combusting said fuel air mixture in pre-burner to pre oxidize the mixture and supplying the pre oxidize mixture at a temperature sufficient to initiate and sustain a low NOx combustion reaction within the preburner and the combustor.

The pre burner 19 can be a catalytic combustor is located in the gas stream between the compressor and the turbine wheels. Once full operating temperature has been reached, the catalytic oxidization of the fuel enables virtually complete combustion with very low levels of UHC, CO and $NO_x$.

The electrically heated mixer completely vaporizes the fuel and delivering it to other pre burner which is can also be maintained at or above a critical light-off temperature by another electric heater, by implementing the steps of FIG. 1, a clean cold start of the engine can be achieved. FIG. 2 illustrates the sequence of steps for enabling a clean cold start of the engine. Initially, a start command is received and the preheater 15 and the heated catalyst pre burner 19 are electrically energized. The engine is accelerated to a low speed so as to flow a minimal amount of air through the preheater 15. Minimal fuel flow is commanded once both of the following criteria are met: (1) the input temperature $T_1$ of the premixer 17 is high enough to ensure complete fuel evaporation, so $T_1 > T_{evap}$; and (2) the temperature of the heated catalytic combustor 17 is greater than $T_{crit}$. The minimal fuel flow can then be cleanly combusted at the heated catalytic combustor 17, to increase temperature $T_3$. Fuel flow is increased so as to raise the heated catalyst exit temperature $T_3$ to a higher value to improve combustion. This causes the main catalytic combustor 24 to start heating up. It should be noted that the control system must limit fuel and air flow so that rated flow of the heated catalytic preburner 19 is not exceeded. At this point, the preburner 19 heater can be turned off.

As the temperature of the main catalytic combustor block 24 starts to increase, the control system may increase fuel flow. As the machine microturbine power generating system continues to accelerates and the system 10 continues to heat and the temperature $T_0$ of the air supplied to the electric pre heater 15 will increase. The electric power to the electric preheater 15 can now be reduced to maintain $T_1$ at its previous value of $T_{evap}$. Once the value of $T_0$ reaches the value of $T_{evap}$, the preheater 15 is turned off. The machine will continue to heat up to its full operating temperature. The start sequence is complete once the whole of the main catalytic combustor 19 is above $T_{crit}$. Full fuel flow is then able to be authorized and the engine can be fully loaded.

The preheat burner 19, used during start, is not used during steady state operation. Preheat burner 15 is supplied with fuel through second fuel inlet control valve, which is in turn fed from fuel supply.

It is foreseeable that the power generating system of the present invention may be operated intermittently. The power generating system is designed for easy start-up. In order to start up a "cold" power generating system, preheat burner 30 is used to bring the system heat up to a point of operability. With first fuel inlet control valve 12 closed, second fuel inlet control valve 14 is opened, allowing fuel to directly enter the preheat burner 30. As the system is motored over, air is pushed, at low temperature through the compressor 16 and turbine 26. Preheat burner 19 uses oxygen in this stream to burn the fuel within the burner. A spark or other device is used to ignite a flame whose combustion products travel through recuperator 22. As the temperature of the heat transmitting circuit of recuperator 22 rises, so will the temperature of the incoming air. Once the catalytic combustion chamber 24 and the incoming air reaches and exceeds lightoff temperature for a fuel air mixture, were such a mixture present, fuel gas inlet control valve is opened and second fuel gas inlet control valve is closed. The fuel air mixture enters and continues through recuperator 22 where it is heated and to catalytic combustion chamber 24 where it begins to ignite and increase the speed of the system. Then the hot combustion products from turbine 26 begin to supply recuperator 22 with the heat necessary to heat the incoming compressed fuel air mixture sufficiently to sustain continuous, steady state combustion in central heat exchanger 20. That is, the system will produce enough of its own heat to be self-sustained.

Figure 3:
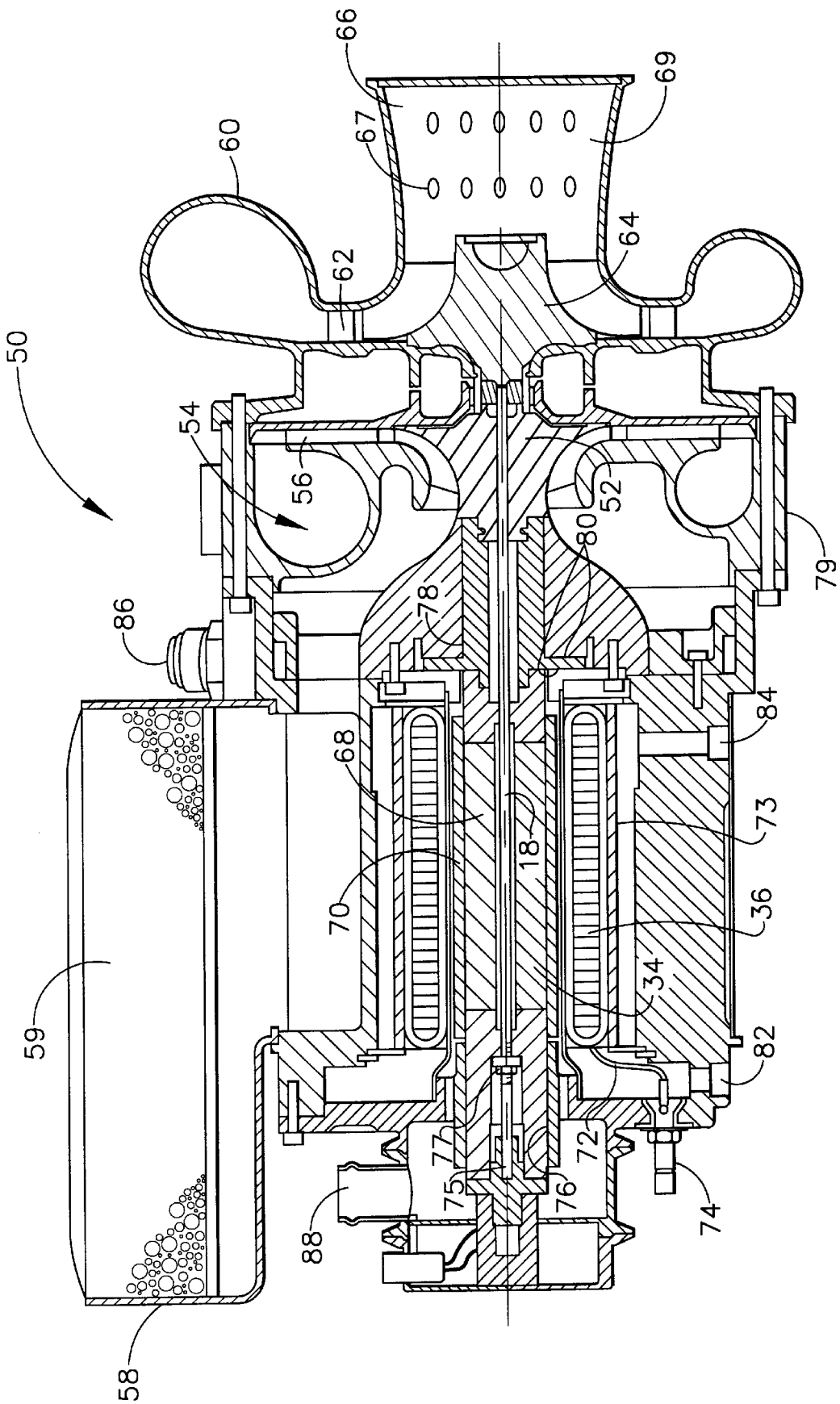
FIG. 3 is an illustration of a cross-sectional view of an engine core for the power generating system.

Referring to FIG. 3, the "engine core" 50 of the power generating system 10 is shown. The compressor 12 includes an impeller 52 having a bore, a compressor scroll 54 and a diffuser channel 56. Air entering an air inlet 58 is filtered by an air filter 59 and directed to the compressor scroll 54. Air flowing out of the compressor scroll 54 is directed to the recuperator 22.

The turbine 14 includes a turbine scroll 60, a plurality of fixed nozzle vanes 62, and a boreless turbine wheel 64. Hot expanding gases leaving the combustor 24 are directed into the turbine scroll 60 and through the nozzle vanes 62, which redirect the hot expanding gas onto the turbine wheel 64. Turbine exhaust gas leaves the turbine 14 through an exhaust diffuser 66, which reduces the temperature and noise of the turbine exhaust gas.

The rotor 38 of the electrical generator 16 includes magnets 68 made of a rare earth material such as samarium cobalt. The magnets 68 are surrounded by a containment sleeve 70 made of a non-magnetic material such as Inconel 718. The stator windings 40 are housed in a generator housing 73. The rotor 38 has a bore and an optional containment sleeve (not shown) contacting a surface of the bore. Power conductors 72 extend from the stator windings 40 and terminat in a power connector stud 74, which is secured to the generator housing 73.

The single shaft 18 is shown in FIG. 3 as a tieshaft 75, which extends through the bores in the rotor 38 and the compressor impeller 52. The tieshaft 75 is thin, having a diameter of approximately or less. The bores have clearances that allow the tieshaft 75 to extend through the rotor 38 and the impeller 52. However, the tieshaft 75 does not extend through the turbine wheel 64. Instead, the tieshaft 75 is secured to the turbine wheel 64. The tieshaft 75 can be secured to the center of the turbine wheel hub by an inertia weld. Thus, the turbine wheel 64 is boreless in that it does not have a bore through which the tieshaft 75 extends. Eliminating the bore reduces stresses in the turbine wheel 64.

When clamped together by the tieshaft 18, the compressor impeller 52, the turbine wheel 64 and the rotor 38 are rotated as a single unit. Under high operating temperatures and rotational speeds, however, the impeller 52, the turbine wheel 64 and the rotor 38 tend to expand and grow apart. Flexing of the tieshaft 75 during operation also tends to separate the faces. To maintain contact between the faces of the impeller 52, the turbine wheel 64 and the rotor at high rotational speeds (80,000 rpm and above), the tieshaft 75 is preloaded. For example, a tieshaft 75 made of titanium can be preloaded in tension to about 90% of yield strength. During assembly, the tieshaft 75 is placed in tension, the impeller 52 and the rotor 38 are slid over the tieshaft 75, and a nut 77 is secured to a threaded end of the tieshaft 75. The tension as maintained as the nut 77 is turned. The tension is highest at the centers of the impeller 52 and the rotor 38. When the impeller 52 and the rotor 38 are rotated, high stresses in the outer portion of these components is countered by the stress applied by the tieshaft 75.

The rotating unit 52, 64, 38 and 18 is supported in a radial direction by inboard and outboard foil journal bearings 76 and 78. The rotating unit 52, 64, 38 and 18 is supported in an axial direction by a foil thrust bearing 80. A base 79 provides generator 16, the recuperator 22, the combustor 24, the rectifier 38, and the inverter 40, to enable the system 10 to exist as a packaged unit.

Various coolant ports are provided for the engine core 50. Provided are ports 82 and 84 for circulating a coolant over the stator windings 40. Also provided are ports 86 and 88 for circulating a coolant over the bearings 76, 78 and 80.

The power generating system 10 can be built in several major modules such as a rotating module, a heat exchanger module, a combustor module, and an electronics module. Each of these modules is relatively lightweight and compact. The modules can be replaced without breaking liquid lines. The use of foil bearings 52 and 54 eliminates the need for an oil-based lubrication system and, therefore, results in low maintenance of the power generating system 10. Scheduled maintenance would consist primarily of replacing the igniter 27, the filter 59 and catalyst elements in the combustor 24.

The power generating system 10 operates on a conventional recuperated Brayton cycle. The Brayton cycle can be operated on a relatively low pressure ratio (3.8) to maximize overall efficiency; since, in recuperated cycles, the lower the pressure ratio, the closer the turbine exhaust temperature is to the inlet temperature. This allows heat addition to the cycle at high temperature and, in accordance with the law of Carnot, reduces the entropic losses associated with supplying heat to the cycle. This high temperature heat addition results in an increased overall cycle efficiency. Air is compressed in a single stage radial compressor to 3.8 bars. The compressed air can be directed to the recuperator 22 where the temperature of the compressed air is increased using the waste heat of the turbine exhaust gas. The temperature of the exhaust gas from the turbine is limited to about 1,300⁻F. in order to help extend the life of the recuperator 22. For exhaust gas temperatures above 1,300⁻F., the recuperator 22 can be made of super alloys instead of stainless steel. The recuperator 22 can be designed for either 85% or 90% effectiveness depending on the economic needs of the customer. In the most efficient configuration, and using the 90% recuperation, the overall net cycle efficiency is 30%, yielding a high heating value heat rate of approximately 11,900 BTU/kWh on diesel.

After being heated in the recuperator 22, the compressed air is directed to the combustor 24, where additional heat is added to raise the temperature of the compressed air to 1,650 F. A combustor 24 designed according to a conventional design can yield a NOx level of less than 25 ppm, and a combustor 24 using a catalyst can yield a NOx rate that is virtually undetectable (commercial NOx sensors are limited to a 2 to 3 ppm detection range). The high enthalpic gas is then expanded through the turbine 14. The compressor 12, the turbine 14, the generator 16, and the single shaft 18—the only moving part in the engine core 50—spins at high speeds of approximately 80,000 rpm or more. The resulting high frequency of around 1,200 hertz is then reduced with the inverter 38 to a grid-compatible 50 or 60 cycles. Resulting is a high power density typified by low weight (about a third of the size of a comparable diesel generator) and a small footprint (for example, approximately 3 feet by 5 feet by 6 feet high).

The high power density and low weight of the technology is made possible through the high speed components which permits large amounts of power using a minimum of material. The unit is completely self-contained in a weather proof enclosure. The power generating system 10 is "plug and play" technology, requiring little more than a supply of clean fuel, liquid or gas.

Thus disclosed is a power generating system 10 that can use multiple fuels including natural gas, diesel and JP-8. The power generating system 10 has a low thermal signature and minimal noise generation. The use of air bearings eliminates the need for an oil-based lubrication system. The electrical generation system 10 has high reliability and minimal service requirements due to single moving part design. The use of a solid-state electronic inverter allows the system 10 to provide a variable AC output. Installation is easy due to a modular and self contained design, and servicing is easy because the system 10 has one moving part and major parts that are easily accessible. The width, length and height of the engine core 50 can be adjusted to fit a wide variety of dimensional requirements.

The power generating system 10 is smaller, lighter, is more fuel-efficient and has lower thermal signature, noise, maintenance and cost penalties than comparable internal combustion engines. Therefore, due to its low initial first cost, low installation costs, high efficiency, high reliability and simple, low cost maintenance, the electrical power generating system 10 provides lower operating and fixed costs than power generation technologies of comparable size.

Potential applications for the power generating system 10 are many and diverse. Applications include use in off-grid applications for standalone power, on-grid applications for peak shaving, load following or base load service, emergency back-up and uninterruptible power supply, prime mover applications (e.g., pump, air conditioning) and automotive hybrid vehicles.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

The invention is not limited to the specific embodiments disclosed above. For example, the present invention could be configured without the electrical generator 18. Turbine power would transmitted and applied directly, as in the case of a mechanically driven refrigeration system. Therefore, the present invention is construed according to the claims that follow.

What is claimed is:

1. A microturbine power generating system for producing power, comprising:
   a turbine for converting gaseous heat energy into mechanical energy;
   a power converter for converting the mechanical energy produced by the turbine into electrical energy;
   a combustor for producing gaseous heat energy by igniting an air and fuel mixture;
   a fuel supply for supplying fuel to the combustor;
   a compressor for compressing intake air and supplying the compressed air to the combustor;
   the turbine receiving the heat energy from the combustor;
   a recuperator disposed between the compressor and the combustor;
   a single shaft coupling the turbine, compressor and power converter to allow the power converter to rotate in unison with the turbine and to thereby use the mechanical energy extracted by the turbine to power the compressor and produce power; and
   a low NOx conditioner segment operably disposed between said compressor and the combustor the low NOx conditioner segment generating preheated compressed air, forming a heated air-fuel mixture with the preheated compressed air to a second temperature pre-oxidizing the mixture and supplying the mixture to the combustor during startup of the system.

2. The microturbine power generating system of claim 1 wherein the low NOx conditioner segment includes a pre-heater for heating air to a temperature $T_1$ to a second temperature $T_2$ sufficient to ensure fuel evaporation.

3. The microturbine power generating system of claim 1 wherein the low NOx conditioner segment includes a mixer coupled to the fuel supply.

4. The microturbine power generating system of claim 2 wherein the temperature $T_2$ of the low NOx conditioner segment is approximately 600° F.

5. The microturbine power generating system of claim 4 wherein the low NOx conditioner segment includes a control for switching on the preheater when the compressor exit temperature $T_1$ of the low NOx conditioner segment $T_1 < 600°$ F.

6. The microturbine power generating system of claim 4 wherein the low NOx conditioner segment further includes a control for switching off the preheater when the compressor exit temperature $T_1 > 600°$ F.

7. The microturbine power generating system of claim 6 wherein the low NOx conditioner segment further includes a mixer for supplying fuel to the compressor air.

8. The microturbine power generating system of claim 1 wherein the low NOx conditioner segment further includes a pre-burner for combusting fuel during startup of the system to preheat the fuel-air mixture supplied to the combustor, to a temperature T4 sufficient to initiate and sustain a low NOx combustion reaction within the pre-burner and the combustor.

9. The microturbine power generating system of claim 8 wherein the pre-burner is a catalytic combustor.

10. The microturbine power generating system of claim 9 wherein the pre-burner is electrically heated.

11. A microturbine power generating system for producing power comprising:
    a turbine for converting gaseous heat energy into mechanical energy;
    a power converter for converting the mechanical energy produced by the turbine into electrical energy;
    a combustor for producing gaseous heat energy by igniting an air and fuel mixture;
    a fuel supply for supplying fuel to the combustor;
    a compressor for compressing intake air and supplying the compressed air to the combustor;
    the turbine receiving the heat energy from the combustor;
    a recuperator disposed between the compressor and the combustor;
    a single shaft coupling the turbine, compressor and power converter to allow the power converter to rotate in unison with the turbine and to thereby use the mechanical energy extracted by the turbine to power the compressor and produce power;
    a low NOx conditioner segment operably disposed between said recuperator and the combustor to receive and heat the compressed intake air, mix the heated compressed intake air with fuel and combust the resulting air and fuel mixture prior to entering the combustor during startup of the system.

12. The microturbine power generating system of claim 11 wherein the low NOx conditioner segment further includes a preheater for heating air temperature $T_1$ sufficient to a second temperature $T_2$ to ensure fuel evaporation.

13. The microturbine power generating system of claim 12 wherein $T_2$ is >approximately 600° F.

14. The microturbine power generating system of claim 13 wherein the low NOx conditioner segment further includes a control for switching on the preheater when the compressor exit temperature $T_1 < 600°$ F.

15. The microturbine power generating system of claim 13 wherein the low NOx conditioner segment further includes a control for switching off the preheater when the compressor exit temperature $T_1 > 600°$ F.

16. The microturbine power generating system of claim 11 wherein the low NOx conditioner segment further includes a mixer for combining compressor air and fuel.

17. The microturbine power generating system of claim 11 wherein the low NOx conditioner segment further includes pre-burner for supplying and combusting fuel during startup of the system to preheat the fuel-air mixture supplied to the combustor to a temperature T4 sufficient to initiate and sustain a low NOx combustion reaction within the pre-burner and the combustor.

18. The microturbine power generating system of claim 17 wherein the pre-burner is heated.

19. The microturbine power generating system of claim 18 wherein the pre-burner is electrically heated.

20. The microturbine power generating system of claim 19 wherein the pre-burner is a catalytic combustor.

* * * * *

UNITED STATES PATENT AND TRADEMARK OFFICE
CERTIFICATE OF CORRECTION

PATENT NO.    : 6,125,625
DATED         : October 3, 2000
INVENTOR(S)   : Lipinski, et al.

It is certified that error appears in the above-identified patent and that said Letters Patent is hereby corrected as shown below:

Claim 1, column 11,
Line 38, insert a comma after the word "combustor";
Line 41, insert a comma after the word "air", and delete the phrase "to a second temperature".

Claim 11, column 12,
Line 29, insert the word "and" after the semicolon.

Claim 12, column 12,
Lines 38 and 39, the phrase "to a second temperature $T_2$" should have been inserted before the word "sufficient", not after this word.

Claim 17, column 12,
Line 55, insert the article "a" before the word "pre-burner".

Signed and Sealed this

Thirtieth Day of October, 2001

Attest:

NICHOLAS P. GODICI
Attesting Officer    Acting Director of the United States Patent and Trademark Office